(12) United States Patent
Scher et al.

(10) Patent No.: US 7,997,370 B2
(45) Date of Patent: Aug. 16, 2011

(54) SURFACE EFFECT SEA TRAIN

(75) Inventors: Robert Scher, Annandale, VA (US); Weimin Hu, Rockville, MD (US); Larry B. Keck, Raleigh, NC (US)

(73) Assignee: Keck Technologies, LLC, Raleigh, NC (US)

( * ) Notice: Subject to any disclaimer, the term of this patent is extended or adjusted under 35 U.S.C. 154(b) by 0 days.

(21) Appl. No.: 12/827,925

(22) Filed: Jun. 30, 2010

(65) Prior Publication Data

US 2010/0263955 A1    Oct. 21, 2010

(51) Int. Cl.
*B60V 1/00* (2006.01)
(52) U.S. Cl. .................... 180/116; 280/504; 114/249
(58) Field of Classification Search .................. 180/116, 180/504, 515; 114/235, 67 A, 249
See application file for complete search history.

(56) References Cited

U.S. PATENT DOCUMENTS

| | | | |
|---|---|---|---|
| 5,644 | A | 6/1848 | Sterens |
| 7,449 | A | 6/1850 | Andrews |
| 10,945 | A | 5/1854 | Burch |
| 522,348 | A | 7/1894 | Martini |
| 731,110 | A | 6/1903 | Larr |
| 893,116 | A | 7/1908 | Walton |
| 913,515 | A | 2/1909 | Lake |
| 1,003,364 | A | 9/1911 | Langston |
| 1,011,372 | A | 12/1911 | Rist |
| 1,075,160 | A | 10/1913 | Seaquist |
| 1,259,860 | A | 3/1918 | Haussler |
| 1,395,889 | A | 11/1921 | Baer |
| 1,458,134 | A | 6/1923 | Constan |
| 1,621,625 | A | 3/1927 | Casey |
| 2,046,064 | A | 6/1936 | Levin |
| 2,076,535 | A | 4/1937 | Baer |
| 2,665,656 | A | 1/1954 | Williamson |
| 2,715,380 | A | 8/1955 | Archer |
| 2,727,485 | A | 12/1955 | Combs |
| 3,035,536 | A | 5/1962 | Archer |
| 3,044,432 | A | 7/1962 | Wennagel |

(Continued)

FOREIGN PATENT DOCUMENTS

DE    10142447 C2    8/2001

(Continued)

OTHER PUBLICATIONS

"Queer Ships" (updated prior art; citation no available).

(Continued)

*Primary Examiner* — Joanne Silbermann
*Assistant Examiner* — Tashiana Adams
(74) *Attorney, Agent, or Firm* — Ferdinand M. Romano; Beusse, Wolter, Sanks, Mora & Maire, P.A.

(57) ABSTRACT

A multiple unit surface effect vehicle movable through an aquatic environment is provided including connected units and lift fans. The multiple unit surface effect vehicle may further include a coupling system and/or a plurality of skirt portions connecting one of the connected units with another of the connected units. The multiple unit surface effect vehicle includes the connected units connected to form a continuous movable unit movable in an aquatic environment. Each connected unit includes a forced air containment chamber defined within each of the connected units. The forced air containment chambers of each of the connected units are connected to form a continuous pressurized air cushion. The lift fans force air into the forced air containment chamber to pressurize the continuous pressurized air cushion.

4 Claims, 15 Drawing Sheets

U.S. PATENT DOCUMENTS

| | | | |
|---|---|---|---|
| 3,065,723 A | | 11/1962 | Tulin |
| 3,066,753 A | | 12/1962 | Hurley |
| 3,370,564 A | * | 2/1968 | Archer et al. ............... 114/77 R |
| 3,400,414 A | | 9/1968 | Windle |
| 3,401,767 A | | 9/1968 | Barr |
| 3,478,711 A | | 11/1969 | Combs |
| 3,481,297 A | | 12/1969 | Mantle |
| 3,527,185 A | | 9/1970 | Yamada |
| 3,732,840 A | | 5/1973 | Dane |
| 3,788,263 A | | 1/1974 | McDermott |
| 3,799,100 A | * | 3/1974 | Marriner ...................... 114/249 |
| 3,822,667 A | | 7/1974 | Marriner |
| 3,858,541 A | | 1/1975 | Metcalf |
| 3,861,342 A | | 1/1975 | Stahl |
| 3,903,825 A | | 9/1975 | Hamy |
| 3,917,022 A | | 11/1975 | Brooks |
| 3,935,831 A | | 2/1976 | Yamaguchi |
| 4,050,395 A | | 9/1977 | Anderson |
| 4,131,174 A | | 12/1978 | Rickards |
| 4,137,987 A | | 2/1979 | Plackett |
| 4,416,210 A | | 11/1983 | Lacy et al. |
| 4,452,163 A | * | 6/1984 | Ayeva ...................... 114/77 R |
| 4,513,679 A | | 4/1985 | Allen |
| 4,535,712 A | | 8/1985 | Matthews |
| 4,660,492 A | | 4/1987 | Schlichthorst |
| 4,878,451 A | | 11/1989 | Siren |
| 5,072,685 A | | 12/1991 | Kaucic |
| 5,105,898 A | | 4/1992 | Bixel |
| 5,111,763 A | | 5/1992 | Moerbe |
| 5,146,863 A | | 9/1992 | Ford |
| 5,176,095 A | | 1/1993 | Burg |
| 5,215,483 A | | 6/1993 | Whitworth |
| 5,415,120 A | | 5/1995 | Burg |
| 5,601,047 A | | 2/1997 | Shen |
| 5,611,294 A | | 3/1997 | Burg |
| 5,727,495 A | | 3/1998 | Reslein |
| 5,746,146 A | | 5/1998 | Bixel |
| 6,167,829 B1 | | 1/2001 | Lang |
| 6,182,593 B1 | * | 2/2001 | Wierick ...................... 114/249 |
| 6,199,496 B1 | | 3/2001 | Burg |
| 6,293,216 B1 | | 9/2001 | Barsumian |
| 6,354,235 B1 | | 3/2002 | Davies |
| 6,431,099 B1 | * | 8/2002 | Huang ...................... 114/77 R |
| 6,439,148 B1 | | 8/2002 | Lang |
| 6,546,886 B2 | | 4/2003 | Burg |
| 6,604,478 B2 | | 8/2003 | Barsumian |
| 6,948,439 B2 | | 9/2005 | Burg |
| 7,013,826 B2 | | 3/2006 | Maloney |
| 7,296,526 B1 | | 11/2007 | Dubose |
| 7,428,939 B1 | | 9/2008 | Ducote |
| 7,464,657 B2 | | 12/2008 | Maloney et al. |
| 7,845,297 B2 | * | 12/2010 | Keck ...................... 114/67 A |
| 2001/0039909 A1 | * | 11/2001 | Smith ...................... 114/253 |
| 2004/0134402 A1 | | 7/2004 | Schmidt |
| 2005/0211150 A1 | | 9/2005 | Maloney |
| 2008/0092792 A1 | * | 4/2008 | Keck ...................... 114/61.1 |
| 2008/0115992 A1 | * | 5/2008 | Scher et al. ................ 180/121 |
| 2009/0038532 A1 | * | 2/2009 | Keck et al. ................ 114/77 A |
| 2009/0071391 A1 | * | 3/2009 | Keck ...................... 114/77 R |

FOREIGN PATENT DOCUMENTS

| | | |
|---|---|---|
| EP | 1022214 A2 | 7/2000 |
| WO | 03/095297 | 11/2003 |

OTHER PUBLICATIONS

Wolff, Douglas "Articulated Tug-Barge—A Case Study" (updated prior art citation not available).

"AVC Trailers and Heavy Lift Systems", Jane's Surface Skimmers, 1976-1977.

"Seasnake: an alternative oil tanker", *The Naval Architect,* Jun.2003.

"Tug-Barge Couplers", Intercontinental Engineering-Manufacturing Corporation, www.intercon.com/tug_barge.asap.

* cited by examiner

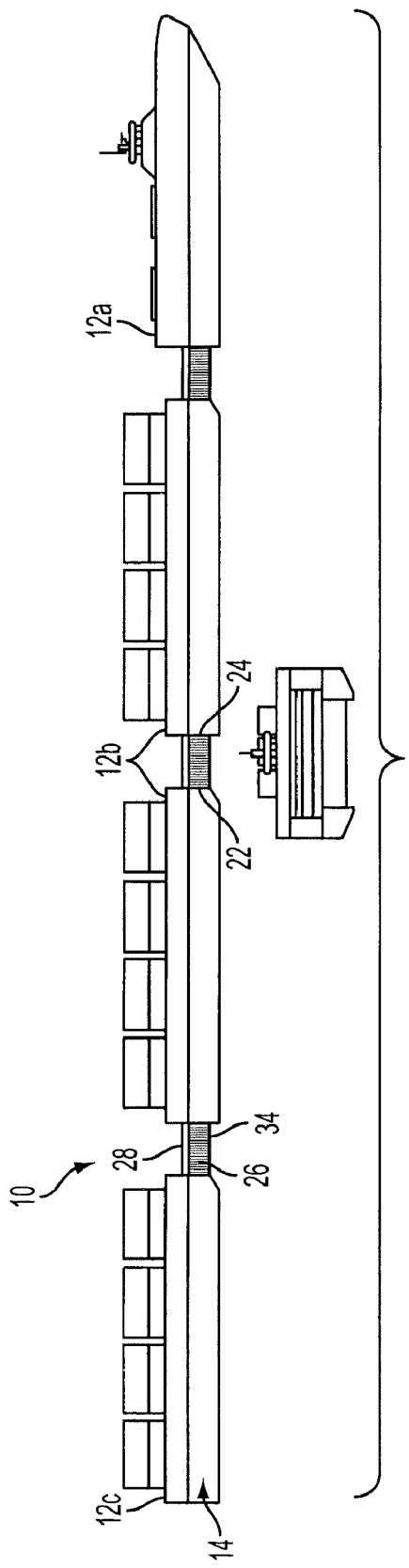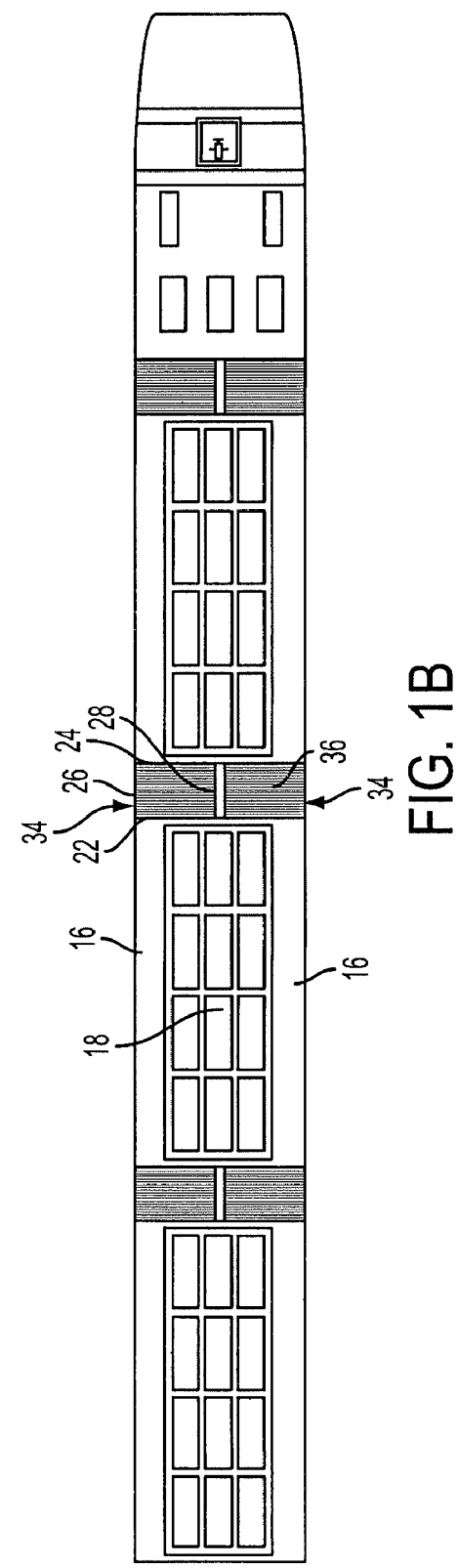
FIG. 1A
FIG. 1B

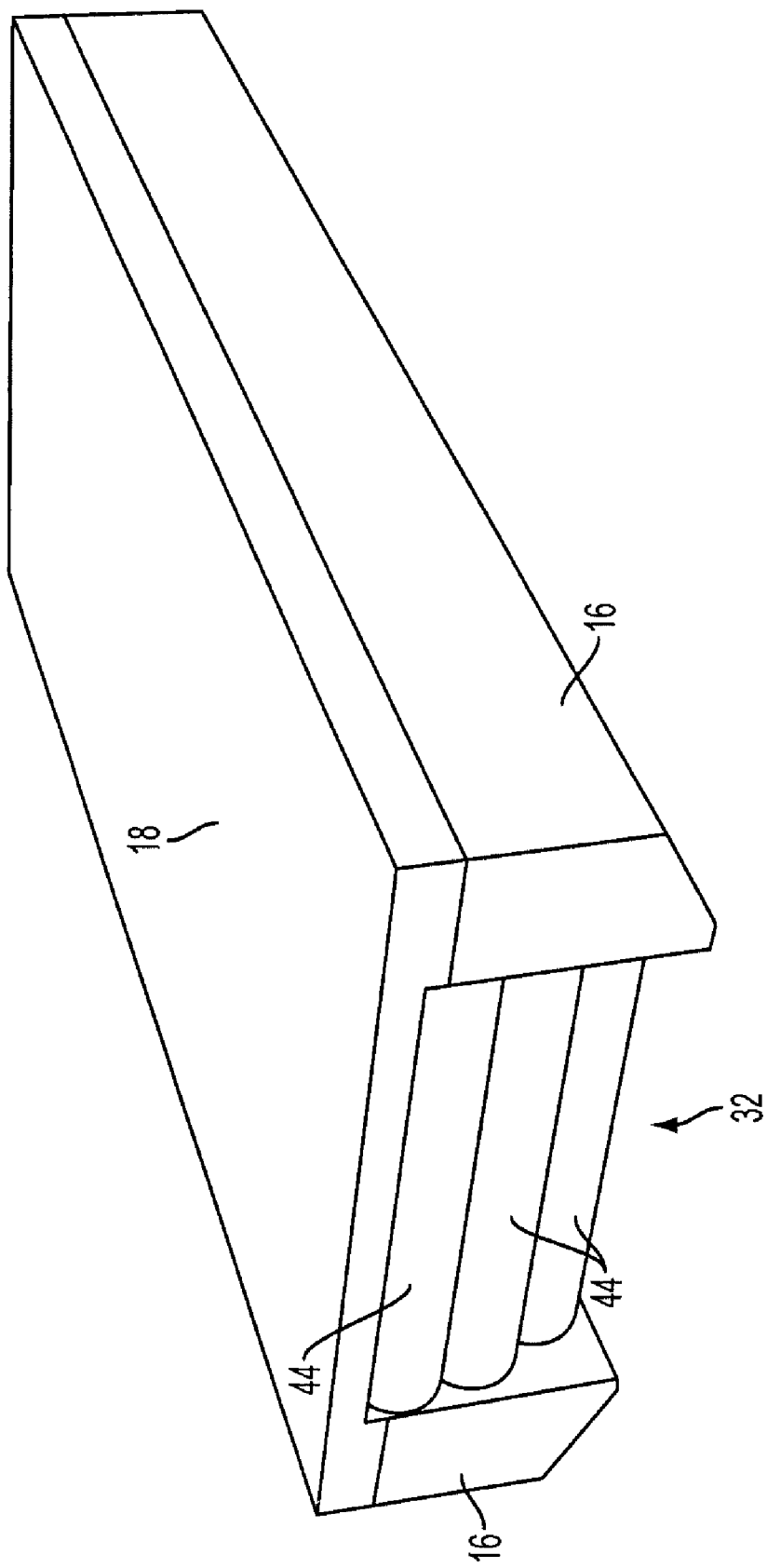

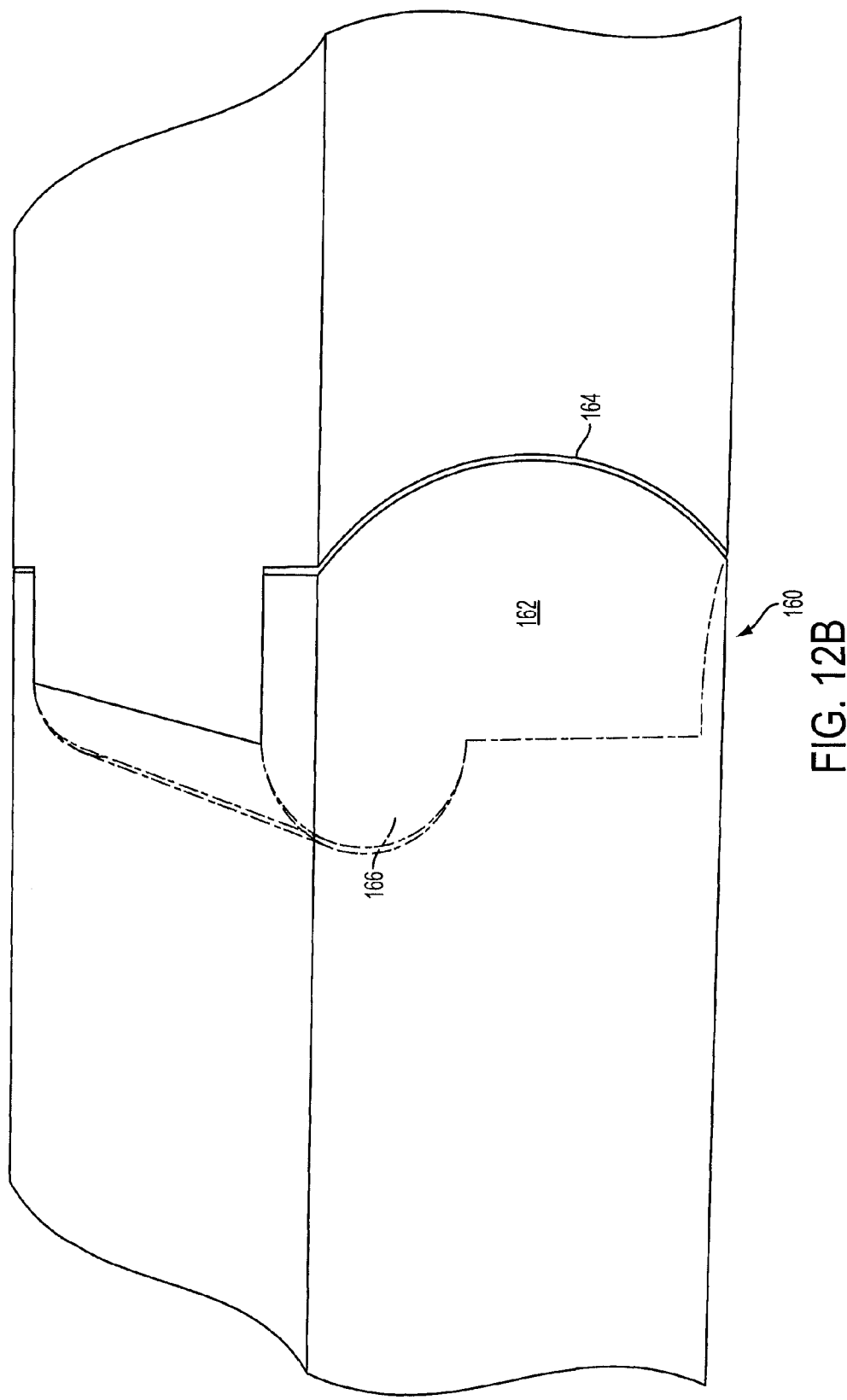

SURFACE EFFECT SEA TRAIN

CROSS-REFERENCE TO RELATED APPLICATIONS

This application claims the benefit of U.S. Provisional Patent Application No. 60/860,479, filed on Nov. 22, 2006, in the U.S. Patent and Trademark Office, and the benefit of U.S. patent application Ser. No. 11/647,581, filed on Dec. 29, 2006, in the U.S. Patent and Trademark Office, the disclosures of which are incorporated herein in their entirety by reference.

BACKGROUND

The present invention relates generally to a surface effect vehicle, and more particularly, to a multiple unit surface effect vehicle in which multiple units are connected together to form a continuous pressurized air cushion.

Generally, surface effect ships are vehicles that ride on a pressurized cushion of air over water when pressurized air is forced into a chamber defined beneath the surface effect ships. Surface effect ships generally include rigid hulls connected by a deck and include stern and bow seals. The space thus formed by the rigid hulls, deck and seals is pressurized with air supplied from lift fans to form an air layer between the hull and above the surface of the water. The air layer is a pressurized air cushion. The surface effect ship is lifted above the surface of the water, generally maintaining a lower portion of the hulls in the water. Because of reduced friction, the surface effect ship is able to move quickly over the water.

Multiple surface effect ships may be connected together to form a sea train such that the ships move together, thus able to carry greater amounts of cargo. When multiple surface effect ships or surface effect units are connected, each surface effect unit includes a separated pressurized air cushion sealed by a stern seal and a bow seal. During pressurization, some air escapes from each of the stern seal and the bow seal, thus requiring more pressurized air to maintain the air cushions.

Further, while the multiple air cushions allow the surface effect ships to move quickly over the water, when connected, the air cushions of the surface effect ships are not able to communicate in a sealed manner with one another.

In addition, each surface effect vehicle or unit requires at least one fan for the unit, and thus numerous fans and numerous power sources need to be utilized to move the entire sea train.

As an alternative to connecting multiple surface effect ships, a single, large surface effect ship may be utilized in order to carry a greater amount of cargo and provide a single continuous air cushion. However, if the surface effect ship is too large, when waves are straddled, a gap is created in the middle of the air cushion between the side hulls. Further, riding over the wave crests creates openings in the front or rear of the large surface effect ship, requiring surging of the lift fans to compensate for the loss of air cushion. Running the lift fans at changing speeds is inefficient and requires the use of larger fans and motors.

SUMMARY

Accordingly, it is one potential goal to provide a multiple unit surface effect aquatic vehicle which allows a plurality of separate units to be connected together to form a continuous movable unit having a single continuous pressurized air cushion. The single continuous pressurized air cushion provides for faster movement over water than multiple air cushions moving together as a sea train.

Further, it is an aspect to provide a multiple unit surface effect vehicle that requires minimal lift fans, which may be attached to a single unit of the separate units. Thus, the amount of power needed to operate the multiple unit surface effect vehicle composed of separate connected units is minimized with respect to the power necessary to operate separate fans for each surface effect unit.

Additionally, it is an aspect to provide a multiple unit surface effect vehicle that provides for a single stern seal and a single bow seal, thus minimizing the amount of air loss as compared to the air loss associated with numerous stern and bow seals when multiple surface effect ships are connected as a train.

Further, it is an aspect to provide a multiple unit surface effect vehicle that allows multiple separate units to move together without experiencing problems associated with yaw and roll of one unit with respect to one another unit.

In addition, it is an aspect to provide a multiple unit surface effect vehicle with a segmented design that provides shorter hull configurations, such that cushion loss is reduced or eliminated.

Additional aspects and advantages will be set forth in part in the description which follows and, in part, will be obvious from the description, or may be learned by practice.

The inventors propose a multiple unit surface effect aquatic vehicle, including a plurality of connected units and a plurality of lift fans. The plurality of connected units forms a continuous movable unit movable in an aquatic environment. Each connected unit includes a forced air containment chamber defined within each of the connected units. The forced air containment chambers of each of the connected units are connected to form a continuous pressurized air cushion. The plurality of lift fans are affixed to at least one of the connected units. The lift fans force air into the forced air containment chamber to pressurize the continuous pressurized air cushion.

A multiple unit surface effect aquatic vehicle may also include a plurality of connected units, a plurality of lift fans and a coupling system. The plurality of connected units forms a continuous movable unit movable in an aquatic environment. Each connected unit includes a forced air containment chamber defined within each of the connected units. The forced air containment chambers of each of the connected units are connected to form a continuous pressurized air cushion. The plurality of lift fans are affixed to at least one of the connected units. The lift fans force air into the forced air containment chamber to pressurize the continuous pressurized air cushion. The coupling system attaches a front end of one of the connected units with a back end of another of the connected units such that the forced air containment chamber of the one of the connected units communicates with the forced air containment chamber of the other of the connected units to form the continuous pressurized air cushion.

The coupling system includes a pitch hinge connector having a plurality of connecting units affixed to each of twin hulls of a first connected unit and corresponding twin hulls of a second connected unit to which the first unit is connected. The connecting units each include a plurality of tension connectors in parallel relationship with one another and connecting the first unit and the second unit, and a hinge disposed between the tension connectors.

The hinge includes a concave receiving portion attached to the first connected unit and a ball protruding portion affixed to the second connected unit. The ball protruding portion is held adjacent the concave receiving portion with the tension connectors.

The multiple unit surface effect vehicle further includes a lower fanned connector skirt connected between the first connected unit and the second connected unit. Each of the first and the second connected units includes a skirt-receiving portion angled at a lower section of the twin hulls of each of the first and the second connected units.

Alternately, a multiple unit surface effect aquatic vehicle may include a plurality of connected units, a plurality of lift fans and a plurality of skirt portions. The plurality of connected units forms a continuous movable unit movable in an aquatic environment. Each connected unit includes a forced air containment chamber defined within each of the connected units. The forced air containment chambers of each of the connected units are connected to form a continuous pressurized air cushion. The plurality of lift fans is affixed to at least one of the connected units. The lift fans force air into the forced air containment chamber to pressurize the continuous pressurized air cushion. The plurality of skirt portions each connect at least one of the connected units with at least another of the connected units and define a forced air skirt chamber between the one of the connected units and the other of the connected units. The forced air skirt chambers of each of the skirt portions communicate with the forced air containment chambers of each of the connected units connected together with a skirt portion to form the continuous pressurized air cushion.

The multiple unit surface effect vehicle further includes a coupling system including a coupler connecting an intermediate portion of one connected unit with the intermediate portion of another connected unit.

The coupler includes an elongated portion having a plurality of ball ends and a plurality of ball sockets. One ball socket is attached to the one connected unit and another ball socket is attached to the other connected unit. The ball ends are receivable into the ball sockets.

The coupling system includes a double link coupling unit in parallel relationship with a coupler. The double link coupling unit includes three elongated portions connected together to form a right triangle and a plurality of coupling sockets. At least one coupling socket is attached to one of the twin hulls of one of the connected units and at least two coupling sockets are attached to a corresponding one of the twin hulls of another of the connected units. A ball end of at least one of the elongated portions is receivable into each one of the coupling sockets. The coupler includes a single elongated portion having a plurality of ball ends receivable into a plurality of ball sockets. One of the coupler ball sockets is attached to the other twin hull of the one connected unit and another of the coupler ball sockets is attached to the corresponding other twin hull of the other connected unit.

The foregoing and/or other aspects of the present invention are achieved by providing a multiple unit surface effect aquatic vehicle, including a plurality of connected units, a plurality of lift fans and a coupling system. The plurality of connected units forms a continuous movable unit movable in an aquatic environment. Each connected unit includes a forced air containment chamber defined within each of the connected units. The forced air containment chambers of each of the connected units are connected to form a continuous pressurized air cushion. The plurality of lift fans are affixed to at least one of the connected units. The lift fans force air into the forced air containment chamber to pressurize the continuous pressurized air cushion. The coupling system includes a convex male portion protruding from each of the twin hull sections of a front end of one of the connected units, a concave female portion of each of the twin hull sections of a back end of another of the connected units, and a hinge affixing the front end of the one of the connected units with the back end of the other of the connected units such that the connected units that are connected with each other are movable with respect to one another.

The hinge is a retractable hinge pin system including a pin inserting portion integrally attached to one of the connected units and a pin receiving portion integrally attached to another connected unit. The pin receiving portion has a pair of concave receiving sections. The pin inserting portion has a plurality of retractable pins extendable into and retractable from the concave receiving section of the pin receiving portion of the retractable hinge pin system.

A plurality of corner fenders is affixed to edges of the pin inserting portions and/or the pin receiving portions. An alignment aid aligning connected units includes a jutting portion extending from one of the connected units and a reception portion indented within another of the connected units.

One of the connected units is hinged together with another of the connected units such that an opening defining an entrance of the forced air containment chamber of the one connected unit continuously overlaps an entrance of the forced air containment chamber of the other connected unit.

BRIEF DESCRIPTION OF THE DRAWINGS

These and/or other aspects and advantages of the invention will become apparent and more readily appreciated from the following description of the preferred embodiments, taken in conjunction with the accompanying drawings of which:

FIG. 1A is a side plan view of a multiple unit surface effect vehicle, according to a first embodiment.

FIG. 1B is a top plan view of the multiple unit surface effect vehicle, according to the first embodiment.

FIG. 5 is a perspective view of a stern connected unit of the multiple unit surface effect vehicle.

FIG. 12B is a perspective view of joined connected units of the multiple unit surface effect vehicle in an unpitched state, according to the fourth embodiment.

DETAILED DESCRIPTION OF THE PREFERRED EMBODIMENTS

Figure 2:
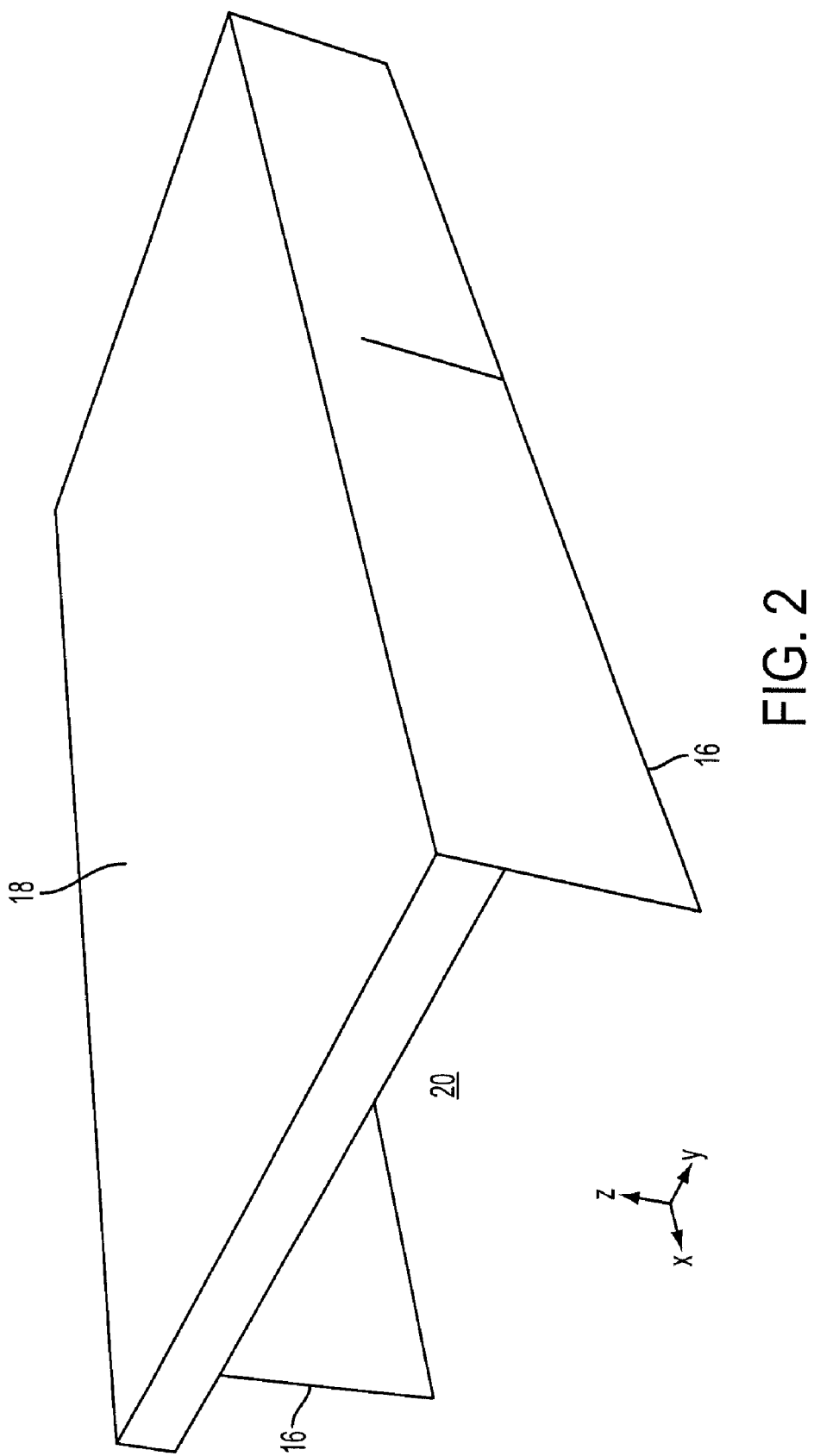
FIG. 2 is a perspective view of a middle connected unit of the multiple unit surface effect vehicle, according to the first embodiment.

Reference will now be made in detail to the present preferred embodiments, examples of which are illustrated in the accompanying drawings, wherein like reference numerals refer to the like elements throughout. The embodiments are described below by referring to the figures.

FIG. 1A is a top plan view of a first embodiment. FIG. 1B is a side plan view of the first embodiment.

The embodiments include a multiple unit surface effect vehicle movable through an aquatic environment. The multiple unit surface effect vehicle 10 includes a plurality of units 12a-c connected to one another. The connected units 12a-c of the surface effect vehicle 10 are connected to form a continuous movable unit movable in the aquatic environment. The connected units 12a-c are individual transport vehicles capable of carrying cargo that are connected to one another to form a single continuous pressurized air cushion 14.

Figure 3:
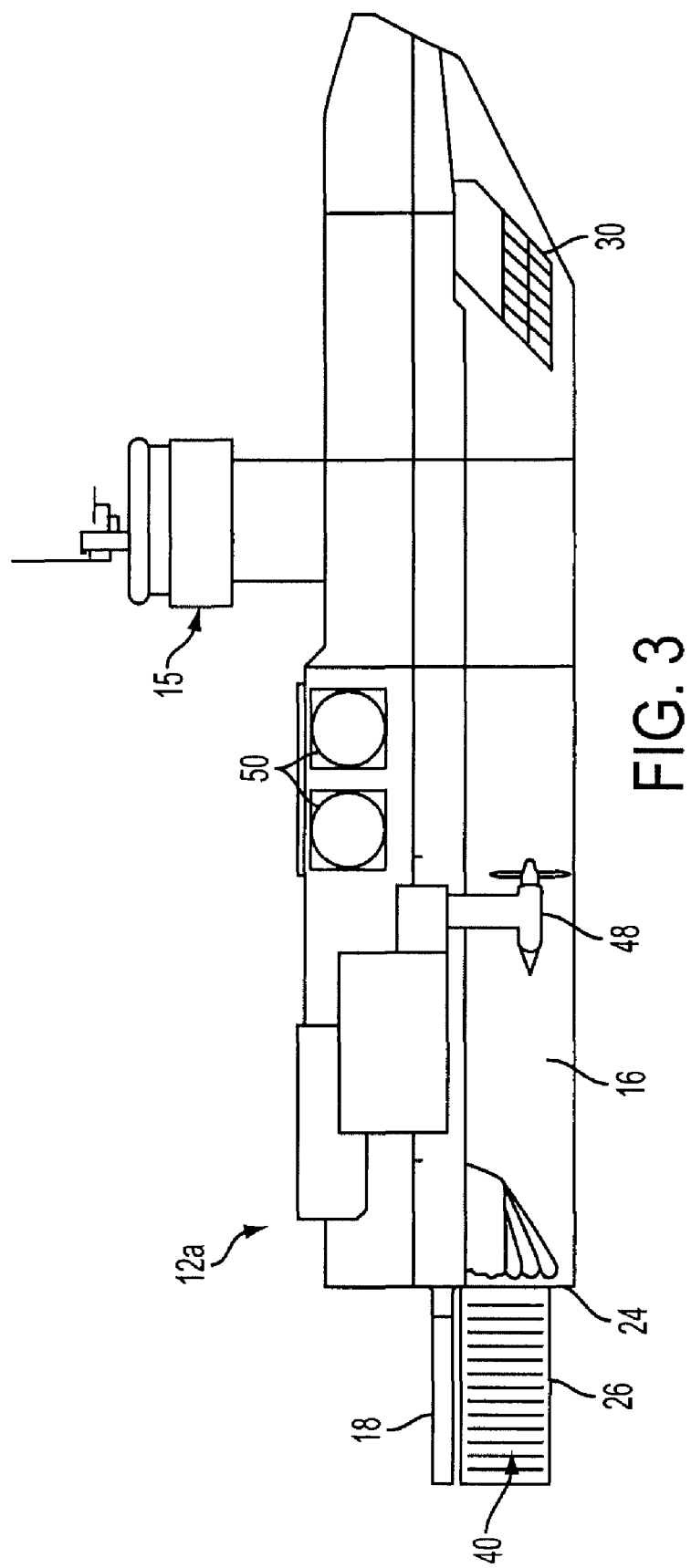
FIG. 3 is a side plan view of a front end connected unit of the multiple unit surface effect vehicle, according to the first embodiment.

The air cushion 14 is generated by lift fans 50, shown in FIG. 3, driven by a motor (not shown). Each of the connected units 12a-c includes rigid twin hulls 16 connected by a deck 18 and defining a forced air containment chamber 20, shown more clearly in FIG. 2, between the twin hulls 16 and the deck 18 of the units 12a-c. The forced air containment chamber 20 extends from a leading edge of the deck 18 at a front end 22 of one of the connected units 12a-c to a trailing edge of the deck 18 at a back end 24 of another of the units 12a-c. The twin hulls 16 are made from, for example, aluminum.

Each of the units 12a-c is connected together such that the forced air containment chambers 20 of the units 12a-c form the single continuous pressurized air cushion 14. The lift fans 50 draw air from the deck 18 through a plenum (not shown), which is directly attached to the deck 18, pressurize the air and then force adequate volumes of the pressurized air into the forced air containment chamber 20 of one of the units 12a-c to which the fans 50 are attached. The pressurized air travels from, for example, a front end connected unit 12a through middle connected units 12b to a rear end connected unit 12c.

The twin hulls 16 prevent dispersion of air forced into the pressurized air cushion 14, which is supplied from the plurality of lift fans 50. The lift fans 50 are affixed to at least one of the connected units 12a-c. The lift fans 50 may be provided in the front end connected unit 12a or may additionally be included in the rear end connected unit 12c. While lift fans 50 are generally provided in only the front 12a or rear 12c end connected units, auxiliary lift fans 50 may be affixed to one or more of the middle units 12b of the multiple unit surface effect vehicle 10.

The pressurized air forced through the forced air containment chambers 20 of the connected units 12a-c, which form the single continuous pressurized air cushion 14, lifts the multiple unit surface effect vehicle 10 out of the water in which the surface effect vehicle 10 is situated, while maintaining a lower portion of the twin hulls 16 in the water. When pressurized air is not being forced into the air cushion 14, the twin hulls 16 support the weight of the surface effect vehicle 10.

The continuous air cushion 14 is formed by connecting the forced air containment chambers 20 of each of the connected units 12a-c. The forced air is contained within the continuous air cushion 14 by the twin hulls 16 of each of the units 12a-c, a bow seal 30 (shown more clearly in FIGS. 4A and 4B) sealing the front of the front end unit 12a and a stern seal 32 (shown more clearly in FIGS. 5 and 6) sealing the rear of the rear end unit 12c. The single bow seal 30 and the single stern seal 32 provided only on the front end 12a and rear end 12c units allow for decreased air loss when the units 12a-c are connected together and the lift fans 50 are operated. The bow seal 30 and the stern seal 32 may be made from, for example, rubberized fabric, or any other type of flexible material capable of providing a sealing function for the front end unit 12a or the rear end unit 12c.

Figure 4A:
FIG. 4A is a perspective view of a bow seal of the multiple unit surface effect vehicle.
Figure 4B:
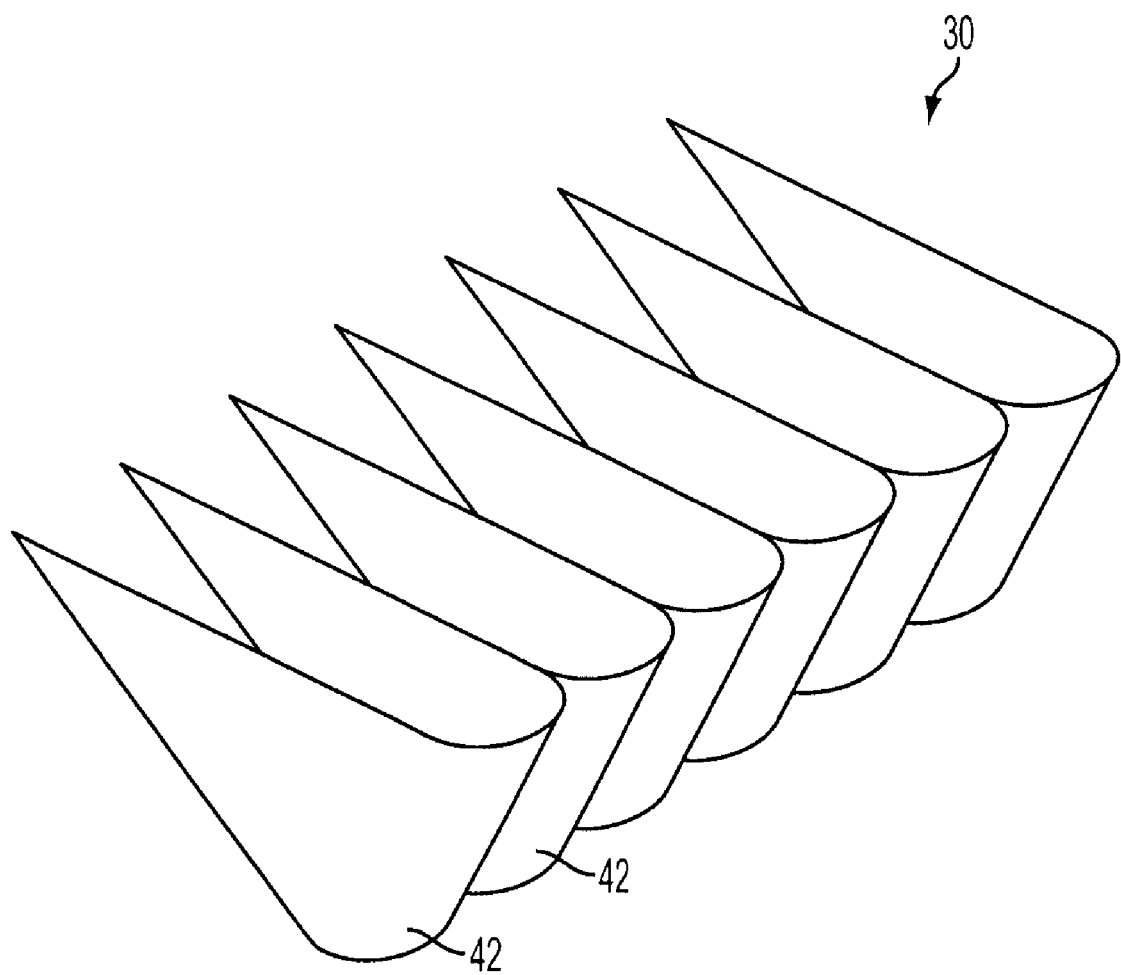
FIG. 4B is a perspective view of fingers of the bow seal of the multiple unit surface effect vehicle.

The bow seal 30, shown more clearly in FIGS. 4A and 4B, may be, for example, a finger seal. The bow seal 30 includes a plurality of individual vertical cylindrical fingers 42 that are each affixed to the underside 43 of the deck 18. Each individual finger 42 is attached only to the underside 43 of the deck 18, but is not attached to either of the twin hulls 16 of the front end connected unit 12a, such that when the bow seal 30 is not pressurized, the gaps are formed between the fingers 42. When the cylindrical fingers 42 of the bow seal 30 are inflated by the force of pressurized air, the fingers 42 expand against each other and balloon outward, pushing the outermost fingers 42 against the side hulls 16 in order to seal the end of the front end unit 12a.

Figure 6:
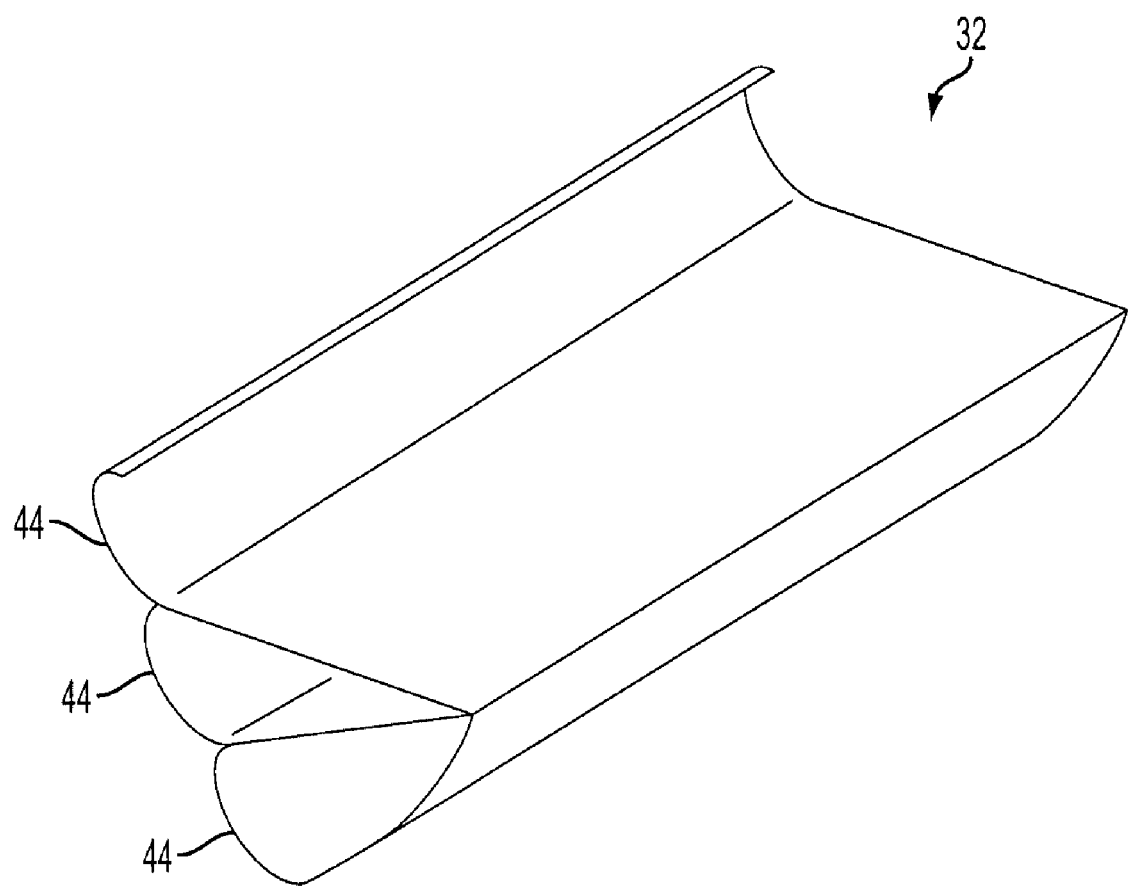
FIG. 6 is a perspective view of a stern seal of the multiple unit surface effect vehicle.

The stern seal 32 may be, for example, a multi-lobed seal, shown more clearly in FIGS. 5 and 6. The stern seal 32 is a single, multi-lobed flexible piece that is attached to the underside 43 of the deck 18 of the rear end unit 12c. When unpressurized, the stern seal 32 drapes downward. When pressurized by a boost fan (not shown), generally to a pressure above the cushion pressure, as shown in FIGS. 5 and 6, the seal lobes 44 balloon outward and a small amount of cushion air bubbles out under the bottom seal lobe 44. The seal lobes 44 are open at both sides of the seal 32. Upon pressurization, the seal lobes 44 slightly press against the insides of the twin side hulls 16.

The connected units 12 are connected such that, with the exception of the head end unit 12a and the rear end unit 12c, the middle units 12b can be separated and removed from the multiple unit surface effect vehicle 10.

Turning back to FIG. 1, the connected units 12a-c are connected by, for example, a plurality of skirt portions 26 each linking one of the connected units 12a-c with another of the connected unit 12a-c. The skirt portions 26 are bellows type slightly collapsible skirt portions 26 which couple the connected units 12a-c together. The skirt portions 26 connect, for example, the front end 22 of one of the units 12a-c with the back end 24 of another of the units 12a-c. Each of the skirt portions 26 may be attached between the front end 22 of one of the units 12a-c and the back end 24 of another of the units 12a-c by, for example, bolting the skirt portions 26 to either of the units 12a-c. However, the skirt portions 26 may be attached in any manner that allows two of the connected units 12a-c to maintain a connection between one another. The skirt portions 26 may be affixed to the back end 24 or the front end 22 of one of the connected units 12a-c prior to connecting one of the units 12a-c with another of the units 12a-c, with the exception of a skirt portion 26 being affixed to a front end 22 of a head end unit 12a or the skirt portion 26 being affixed to the back end 24 of a rear end unit 12c.

The front end connected unit 12a includes the front bow seal 30, shown more clearly in FIGS. 4A and 4B, sealing the front of the front end unit 12a, twin hulls 16, a deck 18, and a back end 24 to which a skirt portion 26 is attached, which define the forced air containment chamber 20 of the front end connected unit 12a. The middle connected units 12b include twin hulls 16, a deck 18, a front end 22 to which a skirt portion 26 is attached and a back end 24 to which a skirt portion 26 is attached, which define the forced air containment chamber 20 of the middle connected units 12b. The rear end connected unit 12c includes the rear stern seal 32 sealing the back of the rear end unit 12c, twin hulls 16, a deck 18, and a front end 22 to which a skirt portion 26 is attached, which define the forced air containment chamber of the rear end connected unit 12c. It should be noted again that it is not necessary that a skirt portion 26 is originally attached to both a front end 22 and a back end 24 of the connected units 12a-c, so long as a skirt portion 26 is connected between units 12a-c when units 12a-c are connected to each other. Specifically, the skirt portion 26 may first be attached to a front end 22, a back end 24, both a front end 22 and a back end 24 or neither a front end 22 nor a back end 24, as long as connected units 12a-c that are connected together are connected between units 12a-c with a skirt portion 26.

Each of the skirt portions 26 includes two sidewall portions 34 connected to one of the hulls 16 of a first of the connected units 12a-c and a corresponding hull 16 of a preceding or following one of the units 12a-c. An intermediate portion 36 of each skirt portion 26 connects a front end 22 of a deck 18 of one of the connected units 12a-c with a back end 28 of a deck 18 of a second of the connected units 12a-c. The skirt portions 26 include a plurality of aluminum plates bonded with urethane to hold a flexible, sectioned shape. Other materials and/or adhesives are also possible. The skirt portions 26 may be thin or thick walled.

Turning to FIG. 3, a forced air skirt chamber 40 is defined between the sidewalls 34 of the skirt portions 26, the intermediate portion 36 of the skirt portion 26, the front end 22 of one of the units 12a-c and the back end 24 of another of the units 12a-c. The forced air skirt chambers 40 of the skirt portions 26 join the forced air containment chambers 20 of each of the connected units 12a-c to form the single continuous pressurized air cushion 14. The additional use of the forced air skirt chambers 40 in communication with the forced air containment chambers 20 provides additional lift than with sole use of the forced air containment chambers 20. That is, support is provided between the units 12a-c.

FIG. 3 shows a side plan view of a front end connected unit 12a of the multiple unit surface effect vehicle 10. The front end connected unit 12a includes a plurality of lift fans 50 which provide pressurized air through the forced air chamber 20 of the front end unit 12a and the bow seal 30. The lift fans 50 may be, for example, back to back vane-axial fans. When the lift fans 50 are operated to generate an air cushion, the lift fans 50 force pressurized air into the forced air chamber 20 of the front end unit 12a. The pressurized air causes the bow seal 30 to seal such that air does not escape the forced air chamber 20 of the front end unit 12a. The pressurized air is additionally forced through the forced air skirt chamber 40 connected to the forced air chamber 20 of the front end unit 12a and then passes into a following middle connected unit 12b. Thus, the pressurized air is continuously forced through the successive middle connected units 12b and forced air skirt chambers 40 until the air is received in the forced air chamber of the rear end unit 12c, causing the vertical cylinders of the stern seal 32 to seal shut, thereby creating the continuous air cushion 14.

While the front end connected unit 12a is shown with lift fans 50, the lift fans 50 may be situated on any of the connected units 12a-c, so long as the lift fans 50 are able to provide sufficient pressurized air to form the air cushion 14.

The multiple unit surface effect vehicle 10 includes propulsion units 48 that propel the surface effect vehicle 10. The propulsion units 48 may be located on the front end unit 12a on the rear end unit 12c, on both the front end 12a and rear end 12c units or on any number of the front end 12a, rear end 12c or middle 12b connected units. Having the propulsion units 48 located on both the front end 12a and rear end 12c units allows for the surface effect vehicle 10 to be separated, providing separate self-propelled sections. In addition, auxiliary propulsion units 48 may be located on any of the connected units 12a-c. The propulsion units 48 may be, for example, waterjets or Z-drive propellers.

The multiple unit surface effect vehicle 10 further includes a plurality of rudders (not shown) such that the connected units 12a-c of the surface effect vehicle 10 are able to be steered together. The rudders are generally situated on the rear end unit 12c, but may alternatively be located on any one of the connected units 12a-c such that the surface effect vehicle 10 is able to be steered using the rudders.

The front end unit 12a may include, for example, a pilot house 15 such that the multiple unit surface effect vehicle 10 is capable of being steered. Alternatively, steering may occur at the back end unit 12c.

Figure 7A:
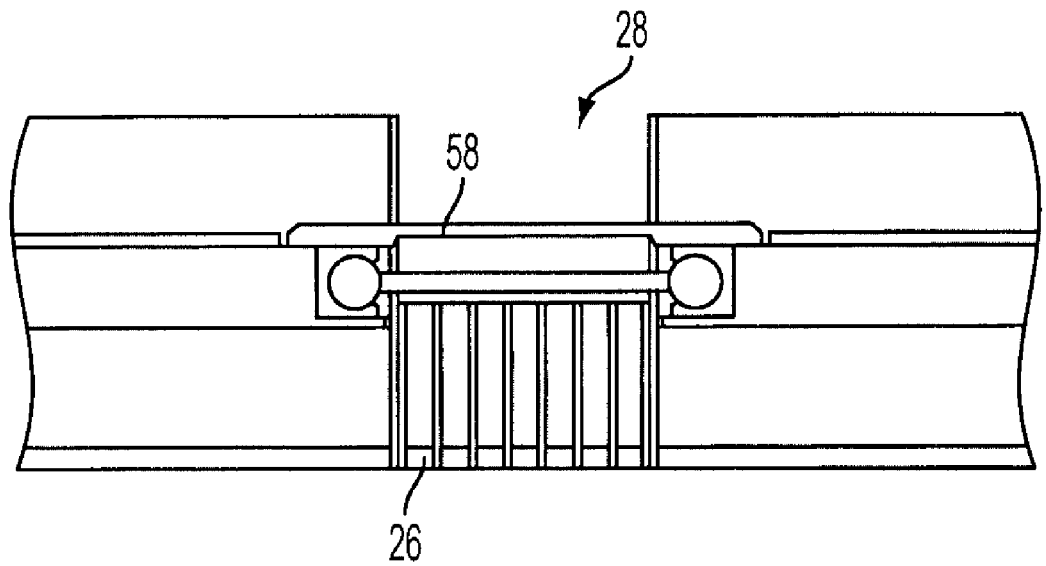
FIG. 7A is a side plan view of a skirt portion and a coupler of the multiple unit surface effect vehicle, according to the first embodiment.
Figure 7B:
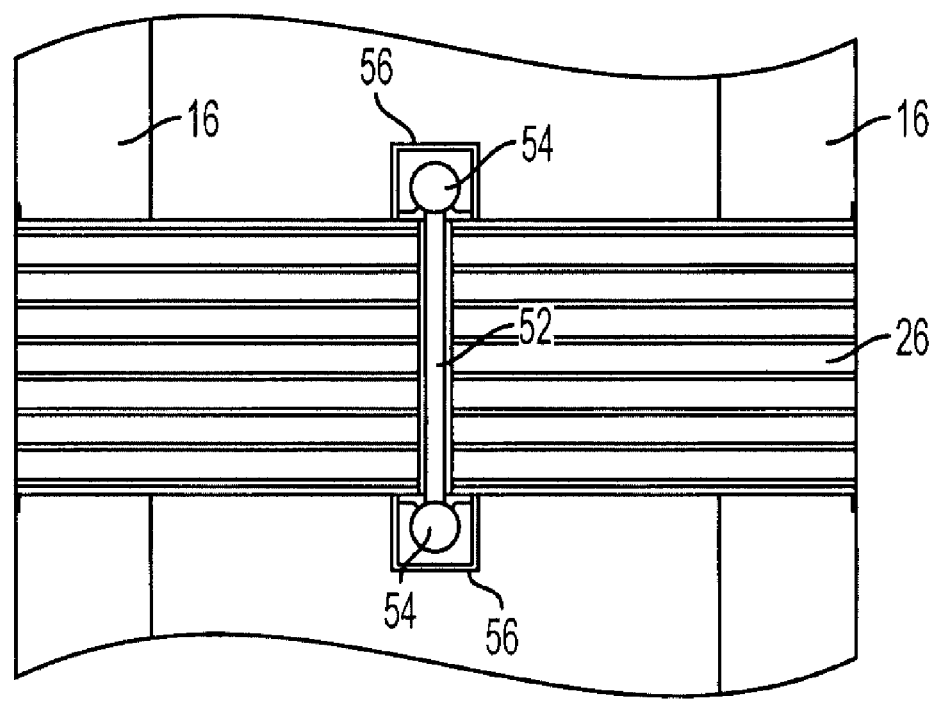
FIG. 7B is a top plan view of the skirt portion and the coupler of the multiple unit surface effect vehicle, according to the first embodiment.

Turning to FIGS. 7A and 7B, a side plan view and a top plan view of the coupler 28 are shown situated above a skirt portion 26. The coupler 28 provides the strength necessary to maintain the units 12a-c connected to one another. The coupler 28 includes a central, elongated portion 52 and a plurality of ball ends 54. Each of the ball ends 54 is receivable into a coupling socket 56 provided on each of the connected units 12a-c, one of the coupling sockets 56 being affixed to one of the connected units 12a-c and another of the coupling sockets 56 being attached to another of the connected units 12a-c such that the ball ends 54 of the coupler 28 are engagable into each of the coupling sockets 56. The coupler 28 that connects the connected units 12a-c may be, for example, a ball and socket joint, a U-joint, etc. The coupler 28 is connected between the connected units 12a-c in a central portion of each of the connected units 12a-c. The elongated portion 52 of the coupler 28 may be made of, for example, steel, a metal composite, etc.

In addition, a ramp 58 may be connected above the coupler 28 between the connected units 12. The ramp 58 may allow cargo, such as a vehicle, to be moved from the deck 18 of one of the connected units 12a-c to another of the connected units 12a-c.

Figure 8:
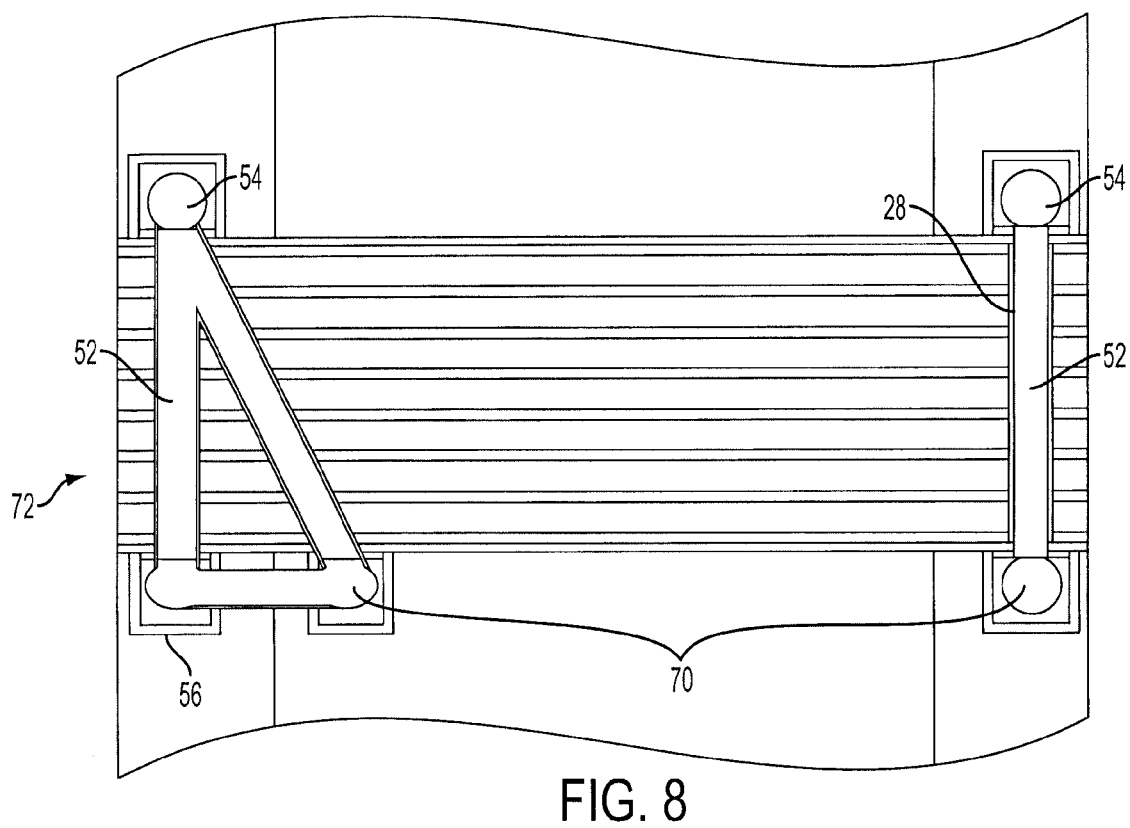
FIG. 8 is a top plan view of the skirt portion and a second coupling system of the multiple unit surface effect vehicle, according to the first embodiment.

Turning now to FIG. 8, a second embodiment of a coupling system of the multiple unit surface effect vehicle 10 is shown including a second coupling system 70. The coupling system 70 includes a plurality of central, elongated portions 52 having a plurality of ball ends 54 at the ends thereof, each ball end 54 being engagable with a corresponding ball socket 56. The coupling system 70 includes a double link coupling unit 72 connecting one of the twin hulls 16 of one of the units 12a-c with one of the corresponding twin hulls 16 of a second of the units 12a-c in parallel relationship with a coupler 28 as described in FIG. 4 connecting the other of the twin hulls 16 of the first of the units 12a-c with the corresponding other twin hull 16 of the second of the units 12a-c.

The double link coupling unit 72 includes three elongated portions 52 in a substantially triangular shape forming a right triangle. The double link coupling unit 72 includes two coupling sockets 56 affixed to one of the connected units 12a-c and one coupling socket 56 attached to the other of the units 12a-c to which the first of the connected units 12a-c is connected. The elongated portions 52 are attached to one another and a ball end 54 of at least one of the elongated portions 52 is receivable into a corresponding coupling socket 56. The double link coupling unit 72 provides for constrained relative yaw and sway of the units 12a-c with respect to one another. The coupling system 70 provides stability between the connected units 12a-c such that the units 12a-c, when attached, are movable as one continuous unit.

Figure 9A:
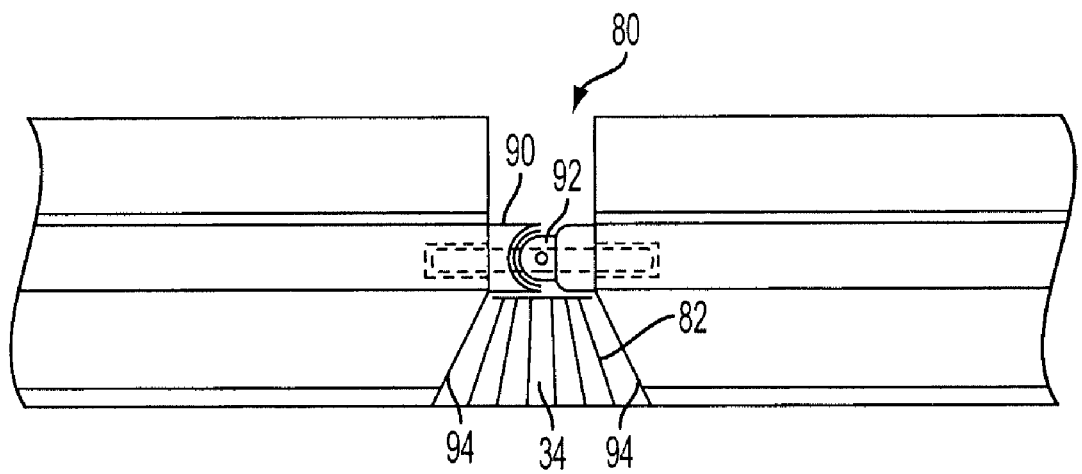
FIG. 9A is a side plan view of a lower connecter skirt and a pitch hinge connector of the multiple unit surface effect vehicle, according to a second embodiment.
Figure 9B:
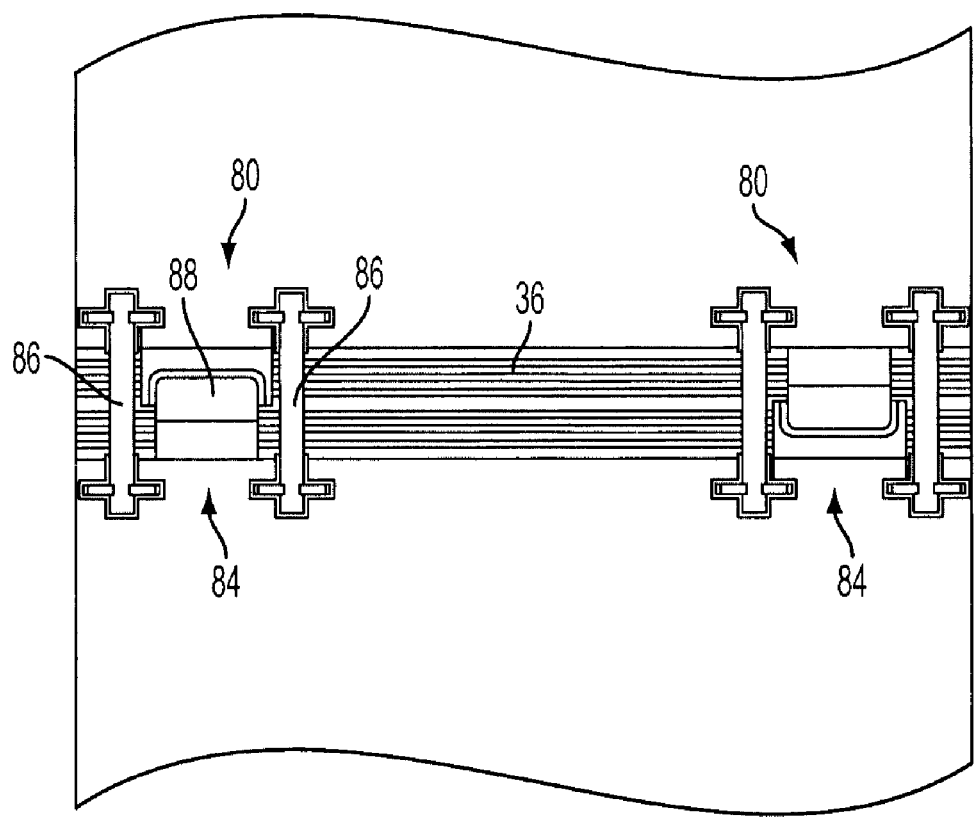
FIG. 9B is a top plan view of the lower connecter skirt and the pitch hinge connector of the multiple unit surface effect vehicle, according to the second embodiment.

FIGS. 9A and 9B show a second embodiment of the multiple unit surface effect vehicle 10, which has a pitch hinge connector 80 and a lower connector skirt 82. The pitch hinge connector 80 includes a plurality of connecting units 84 affixed to each of the side hulls 16 of the units 12a-c that are connected to each other. The connecting units 84 include a plurality of tension connectors 86 in parallel relationship with one another and a hinge 88 disposed between the tension connectors 86. The tension connectors 86 extend from one of the connected units 12a-c to another of the connected units 12a-c. The hinge 88 includes a concave receiving portion 90 attached to one of the connected units 12a-c and a ball protruding portion 92 affixed to another of the connected units 12a-c. The ball protruding portion 92 is held adjacent to the concave receiving portion 90. The tension connectors 86 connect one of the units 12a-c with another of the units 12a-c to which the first one of the units 12a-c is connected. The tension connectors 86 maintain the ball protruding portions 92 of the connecting units 84 together with the concave receiving portions 90 of the connecting units 84.

The lower connector skirt 82 is a connecting skirt portion 26 in which the sidewall portions 34 are formed in a fan-like manner. The lower connector skirt 82 is affixed between two of the connected units 12a-c. Each of the connected units 12a-c includes a skirt-receiving portion 94, which is an angled portion of a lower section of each of the side hulls 16. Sections of the folding lower skirt 82 are inclined such that the lower connector skirt 82 is able to slightly fold upon movement of the surface effect vehicle 10.

Figure 10A:
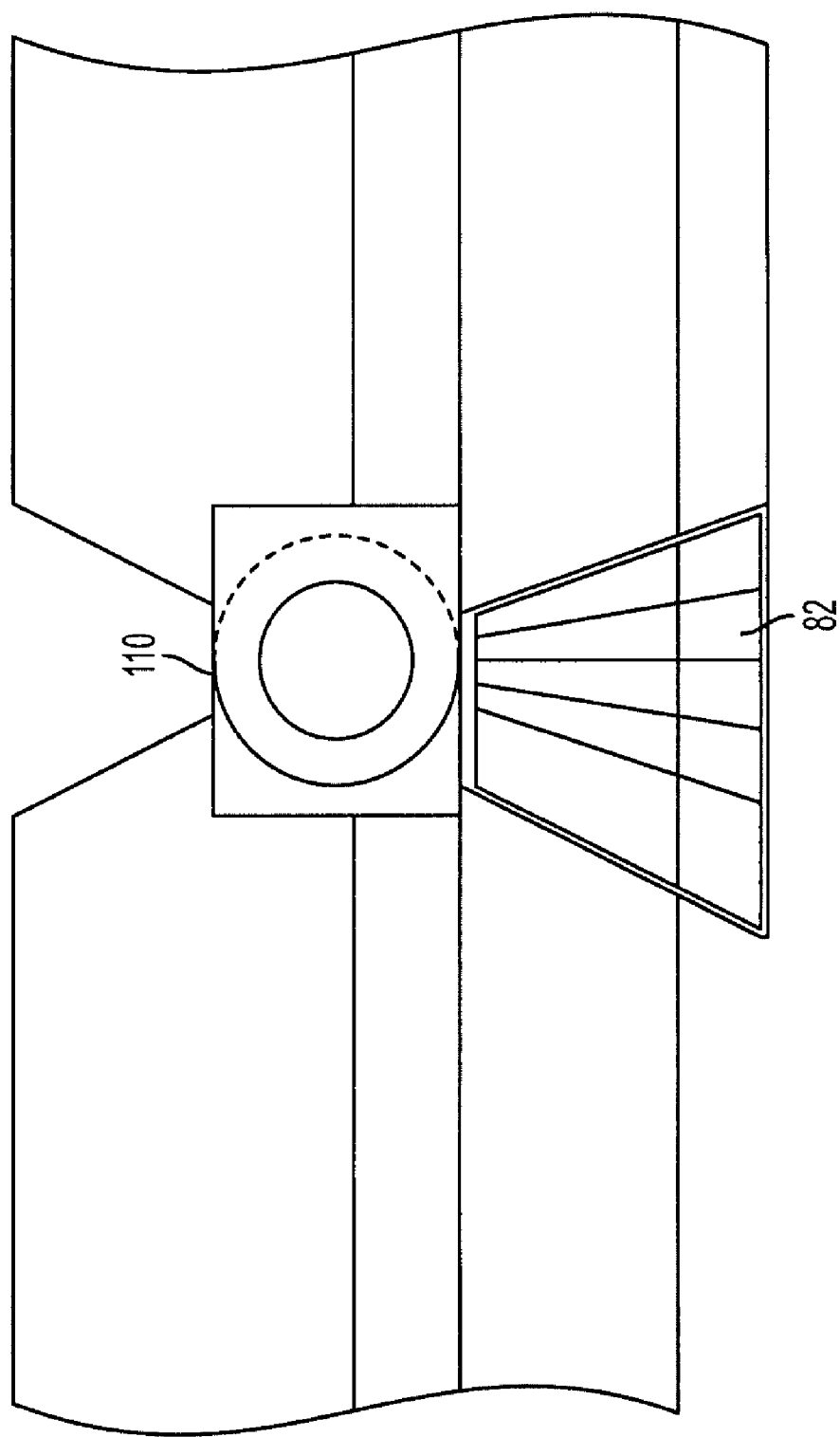
FIG. 10A is a side plan view of a coupling hinge in a closed state and the lower connector skirt of the multiple unit surface effect vehicle, according to a third embodiment.
Figure 10B:
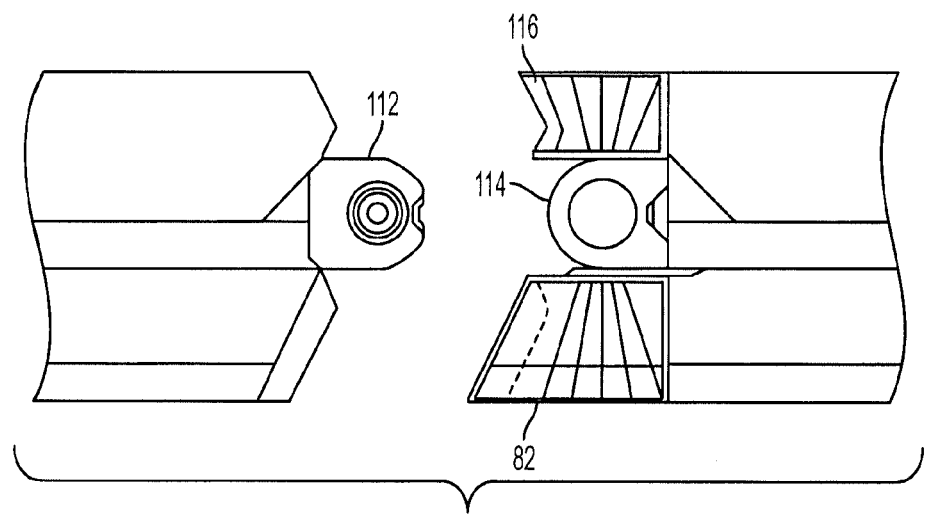
FIG. 10B is a side plan view of the coupling hinge in an open state and the lower connector skirt of the multiple unit surface effect vehicle, according to the third embodiment.

FIGS. 10A and 10B show a third embodiment of the multiple unit surface effect vehicle 10, including a coupling hinge 110 and the lower connector skirt 82. The coupling hinge 110 is a retractable hinge pin system 130, shown more clearly in FIG. 11. The coupling hinge 110 includes a pin inserting portion 112 and two pin receiving portions 114, attached at opposite sides of one of the units 12a-c, shown connected together in FIG. 10A. The lower connector skirt 82 is similar to that shown in FIGS. 9A and 9B. The pin inserting portion 112 and the pin receiving portion 114 are shown separated in FIG. 10B.

The lower connector skirt 82 may be attached to one of the connected units 12a-c and connected to another of the units 12a-c when the units 12a-c are joined together. The multiple unit surface effect vehicle 10 may further include an upper connector skirt 116 to protect against air escaping from the forced air containment chamber 20 of one of the connected units 12a-c if the water in which the multiple unit surface effect vehicle 10 moves is rough, causing a higher level of pitch between the connected units 12a-c.

Figure 11:
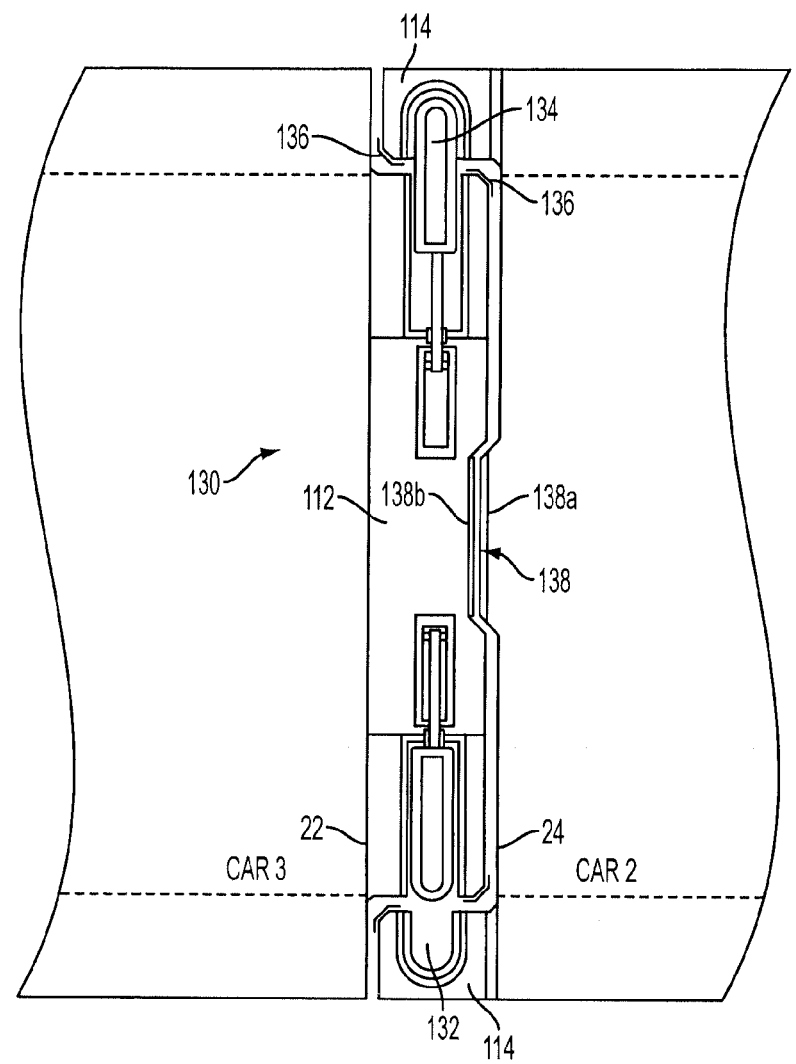
FIG. 11 is a top plan view of the coupling hinge of the multiple unit surface effect vehicle, according to the third embodiment.

Turning to FIG. 11, the retractable hinge pin system 130 is shown in more detail. The retractable hinge pin system 130 includes the pin inserting portion 112, which is integrally attached to a front end 22 of a first of the connected units 12a-c, and two pin receiving portions 114 integrally attached to a back end 24 of a second of the connected units 12a-c, to which the first of the units 12a-c is connected. The pin receiving portion 114 includes a pair of concave receiving sections 132 each attached to the twin side hulls 16 of the second of the connected units 12a-c. The pin inserting portion 112 includes a plurality of retractable hinge pins 134 extendable into and retractable from the concave receiving sections 132 of the pin receiving portion 114 of the retractable hinge pin system 130.

When a first and a second of the connected units 12a-c are to be attached, the pin inserting portion 112 of the retractable hinge pin system 130 abuts against the back end 24 of the second of the connected units 12a-c in a receiving opening 150 (shown more clearly in FIG. 12A) defined within the back end 24 of the second of the connected units 12a-c. The receiving opening 150 is formed between the pin receiving portions 114. The hinge pins 134 are thereafter extended into the pin receiving portion 114, thus locking the first and second of the connected units 12a-c together in a locked configuration. Thus, the retractable hinge pin system 130 allows the units 12a-c to be connected and maintained in a connected state or unconnected upon retraction of the hinge pins 134.

A plurality of corner fenders 136 may be affixed to edges of the pin inserting portion 112 or the pin receiving portions 114. Further, an alignment aid 138 including a jutting portion 138a extending from a first of the connected units 12a-c and a reception portion 138b indented within a second of the connected units 12a-c may be included to assist in alignment of the back end 24 of one of the connected units 12a-c with the front end 22 of another of the connected units 12a-c.

Figure 12A:
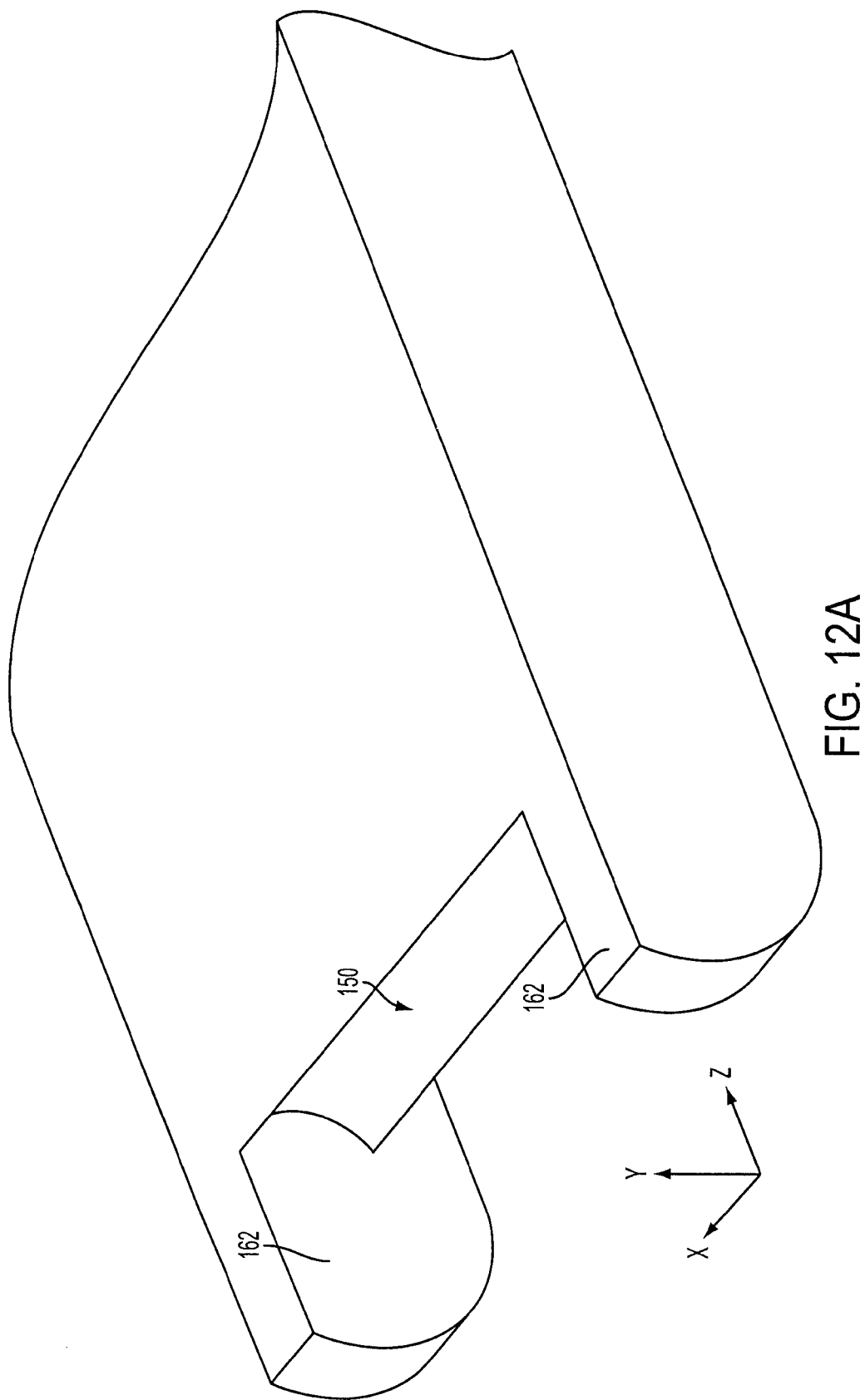
FIG. 12A is a perspective view of a connected unit of the multiple unit surface effect vehicle, according to a fourth embodiment.
Figure 12C:
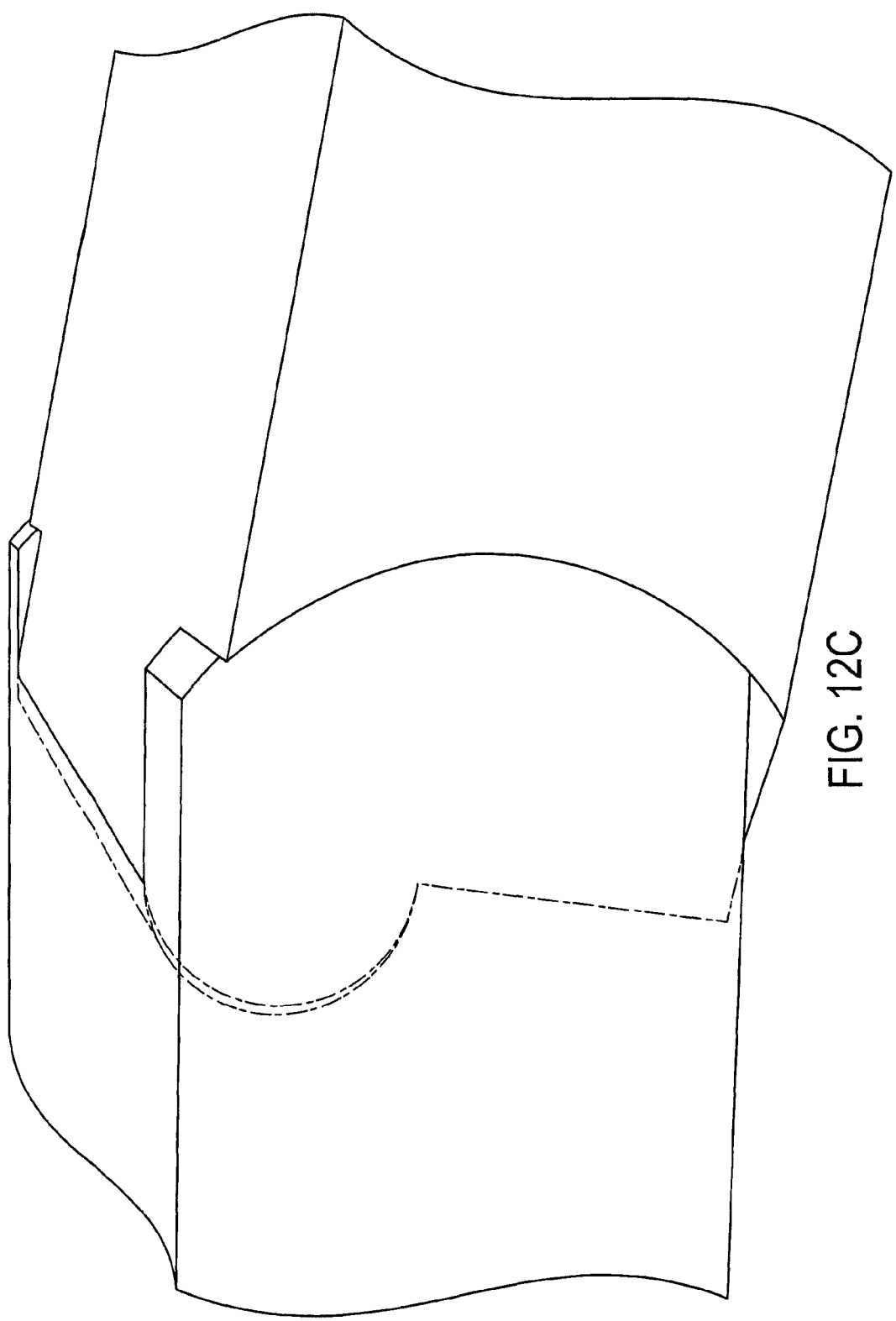
FIG. 12C is a perspective view of joined connected units of the multiple unit surface effect vehicle in a pitched state, according to the fourth embodiment.

FIG. 12A shows a back end 24 of one of the connected units 12a-c of the multiple unit surface effect vehicle 10, according to a fourth embodiment. FIGS. 12B and 12C show a perspective view of joined connected units of the multiple unit surface effect vehicle in unpitched and pitched states, respectively, according to the fourth embodiment.

A concentric connector system 160 includes a pair of convex male portions 162, a pair of concave female portions 164 and a hinge section 166 connecting two of the connected units 12a-c. Each male portion 162 extends from a twin hull section 16 of the front end 22 of one of the connected units 12a-c. Each female portion 164 is a concave portion of the back ends of each of the twin hull sections of another of the connected units 12a-c. The hinge section 166 is affixed within a receiving opening 150 of the front end 22 of one of the connected units 12a-c. The hinge section 166 may be, for example, a retractable hinge pin system as shown in FIG. 11. Alternatively, the hinge section 166 may be integrally attached to a front end 22 of one of the connected units 12a-c and receivable into a receiving opening 150 of a back end 24 of another of the units 12a-c.

The convex male portions 162 are received into the concave female portions 164 in sliding relation such that the connected units 12a-c are movable with respect to one another, while still maintaining the continuous pressurized air cushion 14.

As shown in FIG. 12C, the configuration prevents the connected units 12a-c from moving in any direction, while allowing for pitch movement in an upward and downward direction to thus follow the movement of waves over which the connected units 12a-c must pass. Thus, as the connected units 12a-c are articulated, the multiple unit surface effect vehicle 10 is able to conform to the waves.

Therefore, the multiple unit surface effect vehicle 10 allows for multiple units 12a-c to be connected together to form a single continuous air cushion 14 and allows the units 12a-c to be separated if needed.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A coupling system for connecting individual units of a multi-unit aquatic vehicle, the vehicle comprising:
   a plurality of individual units forming a unit for continuous movement in an aquatic environment, first and second ones of the individual units collectively providing a coupling system for attaching one end of the first unit directly to one end of the second unit,
   wherein the coupling system comprises a hinge pin system including a pin portion integrally attached to the one end of the first unit and pin receiving portions integrally attached to the one end of the second unit, the pin receiving portions providing a pair of receiving sections, the pin inserting portion having a plurality of pins each insertable into one of the receiving sections,
   the coupling system including at least one convex male portion protruding from the one end of one of the first and second units and at least one concave female portion provided at the one end of the other of the first and second units, the one end of the first unit and the one end of the second unit configured so that the convex male portion can be received within the concave female portion in a sliding relationship with the concave female portion, wherein: the convex male portion is movable about the concave female portion and the first unit is thereby movable with respect to the second unit when the first and second units are connected together by the coupling system.

2. The system of claim 1 wherein the hinge pin system is retractable such that the pin inserting portion has at least two retractable pins each extendable into a different one of the concave receiving sections.

3. The system of claim 1 wherein each unit comprises two spaced apart hulls and one of the convex male portions extends from one of the hulls of the first unit and one of the concave female portions extends from one of the hulls of the second unit.

4. The system of claim 1 wherein each of the pin receiving sections is integrally formed with the concave female portion.

* * * * *